United States Patent
Kogelnik

[11] 3,986,020
[45] Oct. 12, 1976

[54] COMMON MEDIUM OPTICAL MULTICHANNEL EXCHANGE AND SWITCHING SYSTEM

[75] Inventor: Herwig Werner Kogelnik, Fair Haven, N.J.

[73] Assignee: Bell Telephone Laboratories, Incorporated, Murray Hill, N.J.

[22] Filed: Sept. 25, 1975

[21] Appl. No.: 616,560

[52] U.S. Cl. .............................. 250/199; 179/15 AL; 179/15 AT; 179/15 FD; 350/96 C; 350/96 WG
[51] Int. Cl.² .......................... H04B 9/00; H04M 3/56
[58] Field of Search ...... 250/199; 179/15 A, 15 AL, 179/15 AQ, 15 AT, 15 FD; 350/96 C, 96 WG

[56] References Cited
UNITED STATES PATENTS

| | | | |
|---|---|---|---|
| 2,064,896 | 12/1936 | Espenschied et al. | 325/53 |
| 2,345,048 | 3/1944 | Hubbard et al. | 179/18 |
| 3,408,131 | 10/1968 | Kapany | 350/96 |
| 3,584,230 | 6/1971 | Tien | 250/199 |
| 3,589,794 | 6/1971 | Marcatilli | 350/96 WG |
| 3,628,022 | 12/1971 | Schulte, Jr. | 250/199 |
| 3,777,149 | 12/1973 | Marcatilli | 350/96 WG |
| 3,803,405 | 4/1974 | Ohnsorge et al. | 250/199 |
| 3,850,503 | 11/1974 | Riseberg et al. | 350/96 WG |
| 3,871,743 | 3/1975 | Fulenwider | 350/96 C |
| 3,912,876 | 10/1975 | Muller | 179/15 FD |
| 3,936,144 | 2/1976 | Caton | 350/96 C |

OTHER PUBLICATIONS

Frequency Selective Coupler for Integrated Optics Systems - Optics Communications - Mar. 1973, C. Elachi et al., pp. 201-203.

*Primary Examiner*—Robert L. Griffin
*Assistant Examiner*—Marc E. Bookbinder
*Attorney, Agent, or Firm*—Wilford L. Wisner

[57] ABSTRACT

In the disclosed common medium multichannel exchange and switching system, optical carrier frequencies and bandwidths are employed and provide switched channels of unprecedentedly large bandwidth. At the same time, the switching network at optical frequencies is of such unprecedentedly small size that it promises to be implementable via integrated optics on only one integrated circuit chip, or, at most, a few chips of suitable material. The system is adapted to optical frequencies in that the common medium is an optical strip guide and optical directional channel-separation filters are employed to couple a plurality of switched customers or switched facilities on to or off of the common medium. At the same time, the system is compatible with the central processing control of the general type employed in current electronic switching systems. In one embodiment, some of the directional channel-separation filters are tunable over the entire bandwidth of the system without compromising the small size of the integrated optics network by employing a variable diffraction-grating effect induced by an acoustic wave. A second embodiment provides distributed switching employing a looped common medium.

12 Claims, 4 Drawing Figures

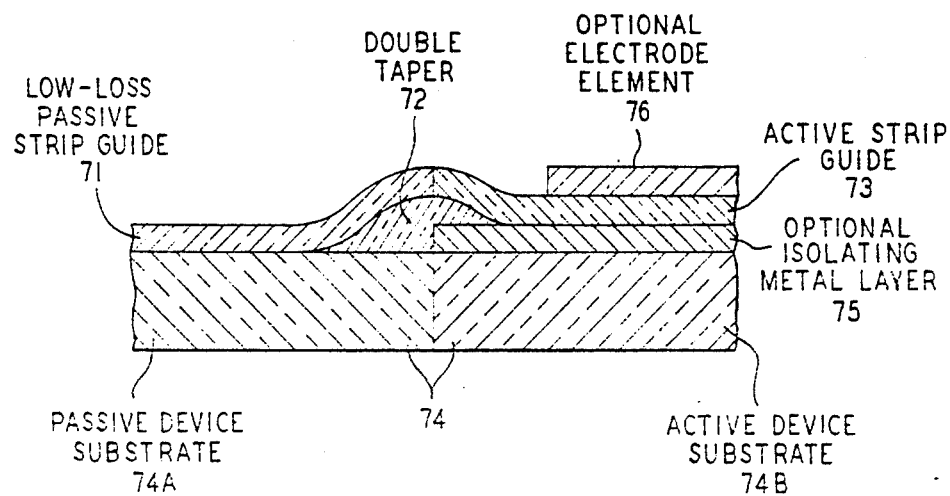
FIG. IA
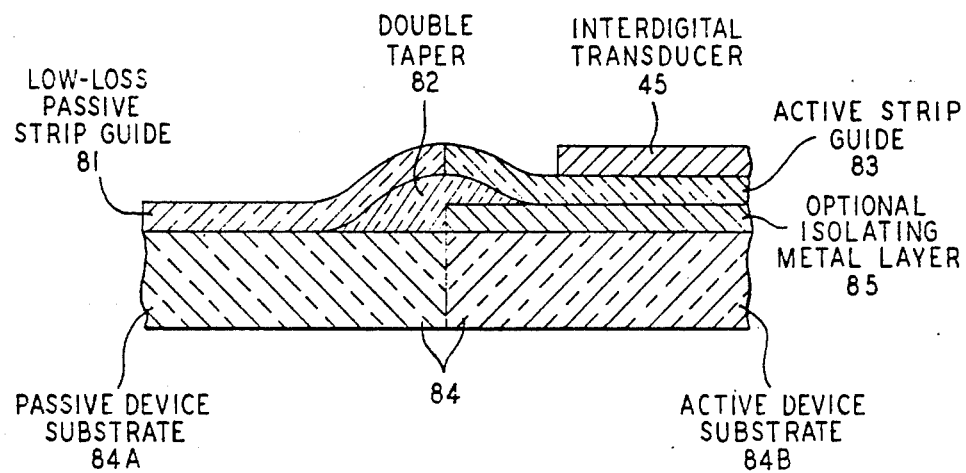
FIG. IB

COMMON MEDIUM OPTICAL MULTICHANNEL EXCHANGE AND SWITCHING SYSTEM

BACKGROUND OF THE INVENTION

This invention relates to exchange and switching systems of the so-called common medium type, particularly adapted for use at optical frequencies.

With the advent of each new electrical or electronic technology, there has typically been an effort to determine its significance for switching in a communication system such as a telephone system. Thus, when tunable filters have been developed in the past there have been subsequent attempts to develop frequency-dependent switching systems that would simplify trunking in the communication system. For example, several prior patents have been directed to so-called common medium multichannel exchange and switching systems to achieve such objectives. One such patent is U.S. Pat. No. 2,064,896 to L. Espenschied et al., issued Dec. 22, 1936. Another is U.S. Pat. No. 2,345,048 to O. Myers et al., issued Mar. 28, 1944, which shows modifications of the Espenschied system directed to application within a central office. These prior systems apparently did not stimulate wide application.

One characteristic of such a system is that, when the number of channels is less than the number of customers or facilities to be switched, the switching logic is effectively transferred to another circuit which controls the frequency-dependent switches. The need for this degree of central control or information processing in the prior systems and the lack of any sufficiently compensating advantages over more conventional systems, made them less attractive than the conventional systems, e.g., crossbar switching systems, even though the latter required a greater number of switches in a typical communication path.

With the advent of the new technology of integrated optics, the attempt to construct optical switching systems on a direct analogy to existing widely used switching systems at lower frequencies fails to recognize much of the unique potential of communication at optical frequencies. Foremost with regard to this potential is the enormous bandwidth available at optical frequencies, so that channels of sufficient bandwidth to afford new and different services become attractive.

It is, therefore, an object of my invention to make more effective use of the unique characteristics of optical systems in implementing an optical switching system.

SUMMARY OF THE INVENTION

My invention is based upon my recognition that a common medium multichannel exchange and switching system becomes much more readily feasible at optical frequencies than in any other frequency range. The existence of enormous bandwidth and a corresponding possibility of very large bandwidth in each switched communication channel makes it attractive to offer new services within the public common carrier communication system, for example, the PICTUREPHONE type of telephone service, TV, or high-speed data channels possibly to every home in the system.

Moreover, a directional channel-separation filter, which does the only switching to be done at the optical frequencies, can be made with devices of amazingly small size, so that, for example, all of such switching or filtering to be done in a central office might be done on one chip, or, at most, a few chips, bearing integrated optical circuits. A directional filter is a four-branch frequency-selective junction of two waveguides in which a single traveling wave in either guide, within the filter passband, will induce a single traveling wave in the other, the direction of the latter being determined by the direction of the former.

Advantageously, in domestic satellite communication systems currently being implemented, the large number of satellites needed to direct beams to any ones of the many receiving areas on the terrain of the United States could be reduced if a compact switching network could be used in the satellite between the repeaters and a number of highly directional antennas or beam directors on the satellite. My compact switching network would allow each beam director to be fixedly oriented toward a corresponding receiving area on the ground and still permit any of several received communications to be selectively routed toward the ground.

According to a feature of my invention, a common medium multichannel exchange and switching system is adapted to optical frequencies in that the common medium is an optical strip guide, or fiber waveguide, and in that the directional channel-separation filters, including the tunable ones, are optical couplers or filters that are capable of insuring that all energy in a particular optical channel is coupled out. Thereby, it is made possible to loop the common medium without incurring intolerable crosstalk or residual noise in the system. Moreover, the small size of the filters and large bandwidths facilitate the use of switching distributed throughout the system, to the extent found advantageous.

In particular, the tunable directional channel-separation filters are tunable optical filters in which a variable optical diffraction-grating effect is induced by an appropriate control effect, for example, an acoustic wave.

Advantageously, the foregoing concepts for switching separable optical channels, all of which are individually of extremely large bandwidth, is applicable to facility switching as well as customer switching. Facility switching is particularly attractive in conjunction with the distributed switching throughout an optical communication system. Distributed switching is particularly attractive for this type of system for many reasons, among which are the following:

1. The very small size and reliability of the directional filters, which reduces the need to place them in a central office and enables them to be placed in the ground within an optical cable housing.
2. The reduced need for central processor control in many instances, especially where the number of available optical channels within the enormous optical bandwidth exceeds the number of customers or facilities to be switched within a prescribed area.
3. Distributed switching is virtually essential for simple implementation of a looped-medium.

The concept of facility switching, together with distributed switching at optical frequencies, implies that each facility being switched will carry with it its ultimate addressing information and suitable instructions for separating the various communications or communication channels that are carried by the switched facility.

More broadly, facility switching can be practiced both within the central office, central processor controlled-embodiment of my invention and within the looped-common medium embodiment of my invention, in the latter case to provide a means for getting out of the common loop and providing interconnection with the larger common carrier public telephone network.

Advantageously, in the various embodiments of my invention, there becomes possible some degree of simplification of the sort of central processing control needed in prior electronic switching systems because of the larger number of very large bandwidth channels that are available within one section of the common medium exchange and switching systems. Because of this possibility of simplification, the central processing control for providing means for getting out of a looped-common medium system of the type hereafter described for my second embodiment is a relatively minor aspect of that embodiment.

It is characteristic of either embodiment of my invention that each part of the network is reciprocal; and, while the channel-separation filters are commonly termed directional filters, any part of the system can be bi-directional to the extent required for the particular communication function. Moreover, all these features can be implemented in ways that are clearly nonblocking, that is, which do not block establishment or maintenance of a separate talking path between two connecting parties independent of every other pair of connected parties in the system.

BRIEF DESCRIPTION OF THE DRAWING

Further features and advantages of my invention will become apparent from the following detailed description, taken together with the drawing, in which:

FIGS. 1A and 1B show pictorial details of the typical strip guide coupling techniques usable in transitions between active and passive sections of strip guides in FIGS. 1 and 2.

DETAILED DESCRIPTION OF ILLUSTRATIVE EMBODIMENT

Figure 1:
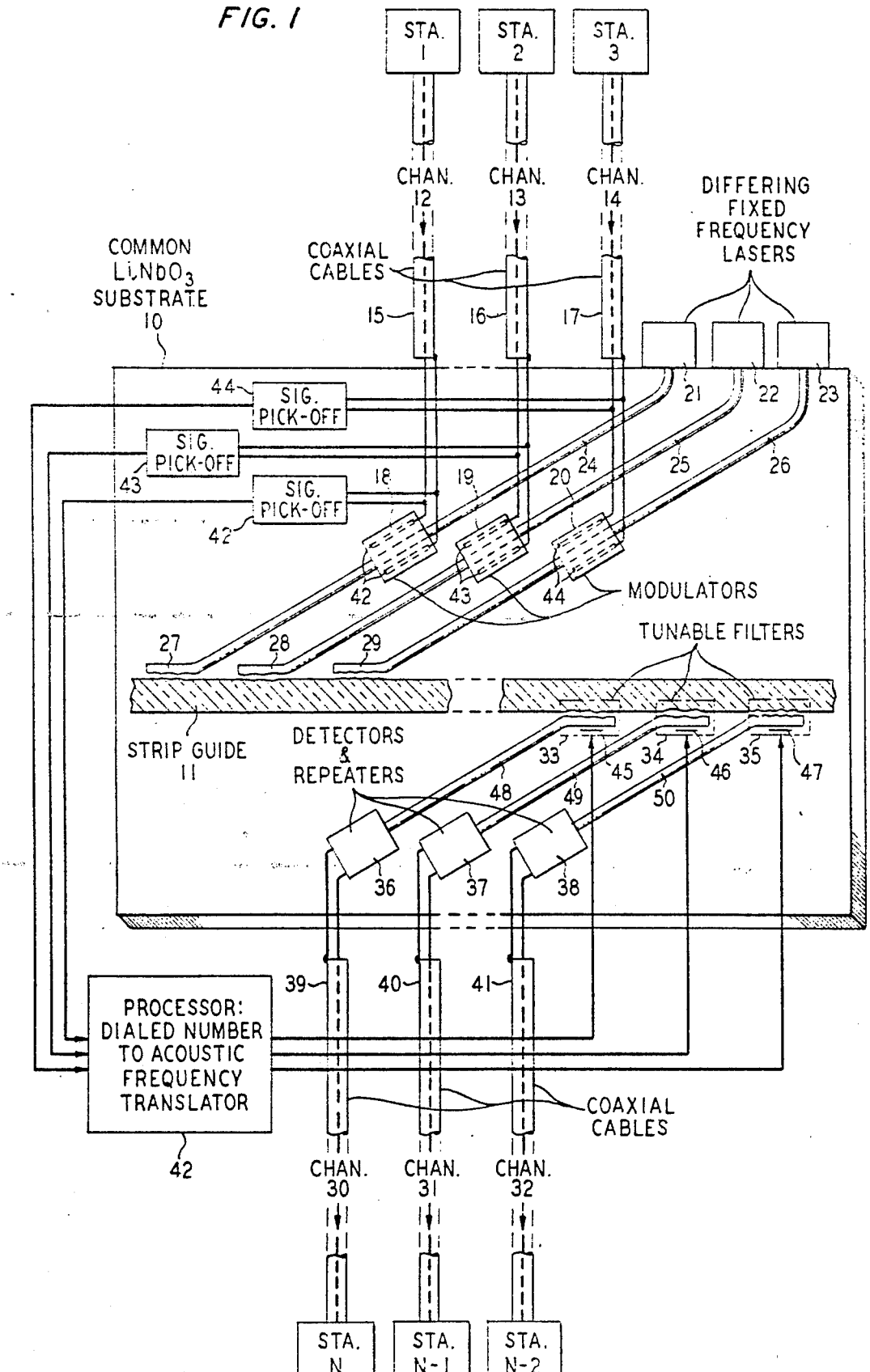
FIG. 1 is a partially pictorial and partially block diagrammatic illustration of a portion of a common medium exchange and switching system proposed to be installed in a typical central office via integrated optical circuits on a few "chips" or common substrates.

In the embodiment of FIG. 1, the common medium over which communication is to be accomplished is an optical waveguide 11, illustratively labeled a strip guide and illustratively titanium-doped lithium niobate disposed on or diffused into a lithium niobate substrate 10, which is more usually called a "chip". Nevertheless, waveguide 11, in principle, can also be an optical fiber; and passive strip guides and substrates using mainly low-loss silica are also feasible. The information capacity of optical waveguide 11 is so substantial that, even for a small-size city, the available bandwidth can be split into separate channel bandwidths with suitable guard bands therebetween sufficient to provide the needed local communication channels. Generally, 10,000 such channels, each with an individual bandwidth of 10 MHz, appears feasible. This individual channel bandwidth should be compared to the approximately total 4 kHz bandwidth allotted to a typical voice frequency telephone channel and guard band in a frequency-multiplexed system.

For purposes of illustration, three such channels 12, 13, and 14 are shown as incoming channels carried via coaxial cables 15, 16 and 17 from stations 1, 2 and 3. The information carried on the coaxial cables 15 through 17 is modulated onto light waves of distinct center frequencies by modulators 18, 19 and 20, which are acting on the outputs of the differing fixed frequency lasers 21, 22 and 23 bonded to the ends of strip guides 24–26 at the edge of chip 10. Illustratively, these lasers are gallium aluminum arsenide lasers operating at about 0.9 micrometers (9,000A), which, however, are tuned to center frequencies separated from one another in wavelength by about one Angstrom (1A) unit. The light from lasers 21 through 23 is guided into and through modulators 18 through 20 via the subsidiary optical waveguides 24, 25 and 26, which again are illustratively strip guides but may also be optical fibers. Illustratively, strip guides 24–26 are metal-diffused regions of the same $LiNbO_2$ substrate 10 as is strip guide 11.

Waveguides 24–26, all single mode waveguides, are envisioned to extend through suitable transitions, discussed hereinafter, all the way through the modulators to the fixed frequency lasers 21–23, whether they are on the same chip or different chips within the central office. Strip guide 11 is also illustratively single mode. The laser beams are modulated on the same chip, by suitable electro-optic modulators 18–20, to which the coaxial cables 15–17 from the customer's premises are respectively connected.

Essential to the operation of the present invention are the optical directional channel-combining filters 27, 28, and 29, which can optionally be tunable over the bandwidth of the common medium communication system, but illustratively in the particular embodiment of FIG. 1 are shown to have a different fixed diffraction-grating on the surface or side edge thereof nearest and parallel to the smooth edge of guide 11. Each such nearest edge is separated from guide 11 by a small gap of the order of a wavelength. Indeed, in the illustrative form of the system of FIG. 1, these input gratings remain fixed; and all the tunability is built into the optical directional channel-separation filters of 33–35 of the outgoing channels 30, 31 and 32.

Like the combining filters 27–29, the tunable optical directional channel-separation filters 33–35 are strip-guide components deposited on the same common substrate 10 as strip guide 11 and separated therefrom by a small lateral gap. The optical signal extracted by them is transferred into a respective optical strip guide 48–50 and thereafter, by suitable transitions, as shown in FIGS. 1A and 1B, is transmitted the necessary distance to a respective one of detectors or repeaters 36–38, respectively. Again, coaxial cables 39, 40 and 41 carry the outgoing signals of the different channels 30 through 32, respectively, to stations N, N-1, N-2, etc. which are the second appearances of all the stations connected to the input channels, the connections obviously being established beteen different parties at different stations.

The nature and operation of the tunable filters; namely, directional filters 33 through 35, of the common medium switching system will now be described in more detail. While these directional filters 33 through 35 are shown to be precisely analogous to directional filters 27 through 29 in the same order, nevertheless, the diffraction gratings of directional filters 33 through 35 are illustratively and preferably provided by acoustic waves, affecting not only strip guides 48–50, but also the substrate between them and guide 11. The frequency of the acoustic waves determines the effective optical diffraction-grating spacing.

The control of the acoustic frequencies applied to the tunable optical directional channel-separation filters 33–35 is accomplished by central processor 42 in response to network control signals picked off the incoming coaxial cables 15–17 by appropriate pick-off networks 42, 43 and 44, respectively. Such pick-off would illustratively be accomplished at or before the electro-optic modulators 18–20 at which the coaxial cables 15–17 terminate. One of the advantages of having the present common medium optical exchange system implemented at a central office with the fixed frequency lasers 21–23 therein is the opportunity to do this network control signal processing by conventional apparatus and techniques.

The tunable directional filters 33–35 may be implemented as tunable acousto-optic diffraction-grating filters in which the acoustic wave is made to propagate in and through the guide materials of strip guide 11 and the respective one of strip guides 48–50 and through the intervening portion of substrate 10. Attractive for this type of tunable directional filter is an application of an asymmetric waveguide principle spelled out in more detail in U.S. Pat. No. 3,850,503, issued Nov. 26, 1974, to L. A. Riseberg et al. According to this principle, the waveguides 48–50 would be of different width from strip guide 11 and would have different propagation constants which can be tuned into an energy exchange relationship with strip guide 11 only by acoustic waves of respective different center wavelengths. On a lithium niobate substrate 10, all of the strip guides 24–26 and 48–50 would illustratively be titanium-diffused regions of the lithium niobate, diffused to width and depth selected to give the desired appropriate propagation constant. Such material, both the lithium niobate substrate and the titanium-diffused strip guides, are very high quality materials for supporting acoustic waves and acousto-optic interactions.

The central processor 42 may be basically similar to the central processor of existing electronic switching systems for communications, as disclosed in R. W. Downing U.S. Pat. No. 3,570,008, issued Mar. 9, 1971. For example, processor 42 would use central processor 100 of the Downing et al. patent; and the switching network of that patent would be simplified to eliminate trunking and related multiple stages of switching and to include $(N-1)^2$ junctors for the N channels. Its output connection control signals would be employed in a modified way to drive electrical oscillators at the desired electrical frequencies for application to transducers 45 through 47 to produce the like acoustical frequencies, instead of completing a talking path directly. A great variety of techniques are known in the art for generating such oscillatory electrical signals at any of a selected multiplicity of frequencies.

While it might appear that the switching problem of the described optical exchange system has merely been translated to that of the general switching problem of lower frequency systems, the latter is a problem that is already solved, for example, by known processors 42; and it simplifies the problem of devising new optical technology. It should be clear that the optical circuit technology for fixed diffraction-grating directional channel combining filters and for tunable acousto-optic diffraction-grating channel separation filters is now within the capabilities of the art.

The phase matching for transfer in the apparatus of the Riseberg et al patent is based on the fact that the curves describing the propagation constants of the guides with respect to optical wavelength have a varying separation with wavelength, so that phase matching is supplied only by an acousto-optic grating vector, that is, its equivalent propagation constant, of a different length than for any other optical wavelength. Therefore, each filter requires a distinct and different acoustic wavelength. Since a band of optical wavelengths is to be coupled across the gap, the acoustic grating should have a selected length, which determines the bandwidth of coupling according to the principle that the bandwidth is inversely proportional to the length, that is, number of lines, of the grating.

Like bandwidth determination may be provided for the fixed gratings of the optical directional channel-combining filters 27–29 primarily by controlling the length of the grating.

Techniques for coupling passive optical strip guides 24–26 and 48–50 into active lithium niobate waveguides, such as modulators 18–20 or tunable filters 33–35, with their transducers 45–47, without substantial loss are disclosed in U.S. Pat. No. 3,833,262, issued to I. P. Kaminow et al. on Sept. 3, 1974, the coupling being implemented in a straight section of the respective strip guides, with any needed electrodes or transducers in proximity to the active section, for example, to either side.

The implementation of this coupling technique from one thin film guide to another is shown in FIG. 1A. This showing is the same as that in the last above-cited patent to I. P. Kaminow with the modification that optional isolation is provided that can accommodate a large change in substrate index, as well as the direct superposition of one or more electrodes 76. Such superposition is an optional alternative to the above-mentioned lateral disposition of electrodes. Specifically, in FIG. 1A the passive section of strip guide is labeled 71. The connecting double-taper of the I. P. Kaminow patent is taper 72 and the active strip guide is illustratively strip guide 73. There may be a common substrate 74 in the case of a lithium niobate chip 10, as in FIG. 1; or the material of the substrate may be changed to have components 74A and 74B by inserting an isolating layer of silver 75 under a portion of the strip guide and the double-taper 72 to isolate them from a possible sudden step change in index of the substrate component 74B under active strip guide 73, if lower index materials are used to provide and support passive components. The use of isolating silver layer 75 is disclosed in the copending patent application of P. K. Tien, Ser. No. 531,207, filed Dec. 9, 1974, now U.S. Pat. No. 3,948,583 and assigned to the assignee hereof. A similar detailed configuration for tunable filters 33 through 35 is shown in FIG. 1B. All of the components are precisely similar to those of the components of FIG. 1A, except that they are labeled 10 digits higher and except that the electro-acoustic transducer 45 is illustratively of the well-known interdigital type instead of the electrode 76 of FIG. 1A.

Coupling by directional channel-combining filters 27–29 into common medium strip guide 11 occurs by guide-to-guide coupling of the same general type as is described in the above patent to Riseberg et al., except that the diffraction-grating constants and the laser center frequencies are fixed. The phase-matching characteristics of such guide-to-guide coupling is the same whether or not the coupling is of fixed type, or whether it is tunable as in the case of the tunable directional channel-separation filters 33–35.

Figure 2:
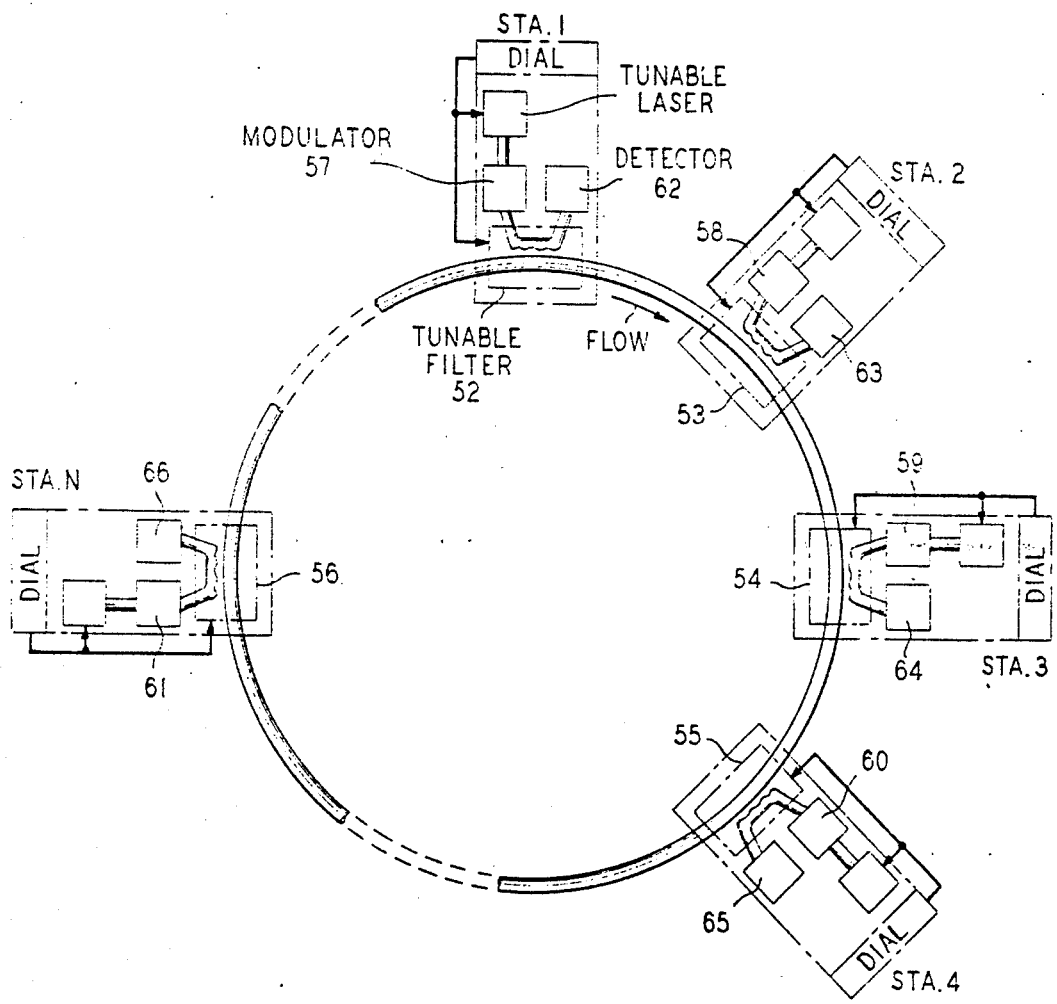
FIG. 2 is a partially pictorial and partially block diagrammatic illustration of a second embodiment of my invention employing distributed switching and tunable lasers in a looped-common medium exchange system in which the number of available channels equals or exceeds the number of customers or facilities to be switched.

In the complete system diagram of FIG. 2, which is modified from that of FIG. 1 to eliminate or, at least, simplify central processor 42, it should illustratively be made clear that the entire common medium, in this case the optical fiber waveguide 51, can be implemented in the form of an uninterrupted complete loop. If the optical energy were not nearly completely extracted at the selected output coupling point it could continue to propagate at detectable levels around the loop a plurality of times until no longer detectable. This embodiment is designed specifically to take advantage of the nearly complete output coupling of energy that is now possible in an optical version of a common medium exchange and switching system. Even with incomplete coupling, crosstalk would be minimal with properly chosen guard bands and selectivity of the directional filters.

It is now assumed, by way of modification of the embodiment of FIG. 1, that there need be only one optical directional filter, which serves both for channel-combining and channel separation for each station. As a called station directional filter, it is associated with a unique and preassigned acoustic frequency and corresponding optical channel frequency band. As a calling station directional filter, it is capable of assuming whatever acoustic frequency matches that of the desired called station. Thus, each of the tunable directional filters 52, 53, 54, 55, and 56 is a tunable acousto-optic diffraction-grating type directional filter similar to filters 33–35 of FIG. 1, which utilizes directional filtering properties to receive modulated optical waves from a modulator 57, 58, 59, 60 or 61 for transmission onto guide 51 in one direction, e.g., towards station 2, and to receive information from guide 51 from the other direction, e.g., station N, for transmission to detector 62, 63, 64, 65 or 66.

Note that in both cases the actual optical wave propagation around loop guide 51 is clockwise; but that the directional coupler aspects of the couplers are effective to direct received waves to the detector and to properly launch waves from the corresponding modulator.

Two things should be clear about the specialized embodiment of FIG. 2. First, the loop guide 51 can be quite an extended serpentine loop, even though shown as circular, so that it may reach every home in a reasonable size city, or every computing center and a central computer in a time-sharing computing system. Second, the use of such a common medium loop 51 is feasible only where the available channels exceed in number the number of facilities or customers, e.g., stations, to be switched. In each case of a completed communication path, the dialed number has set the tunable laser frequency of the local station laser and the acoustic coupling frequency at its own coupler via conventional control loops or schedulers (not shown in detail).

For the purposes of integrating such a system into a larger nation-wide network, e.g., a multiplicity of loops like that shown in FIG. 2, it will be necessary to assign several of the stations as switchable facilities designated for connection with the outside world. Such interconnection with the outside world would typically involve central processing or switching control as is common in existing systems. The called numbers for all points outside of the loop system would have to include sufficient information to control the further switching beyond the interconnecting station or facility, as well as insuring that all such "outside" numbers will be routed to such a station. It is foreseen that this requirement for information will not exceed that available through the use of central office designations and area codes and, indeed, may be able to rely only on the use of area codes for that purpose.

Such an interconnection station or facility may be designed to operate as a called station within the local system with only one characteristic band of acoustic frequencies for coupling or with several bands of acoustic frequencies. In the latter case, less information needs to be encoded into and decoded from the signal itself in order to control the central processors operating in the larger external network, as the interconnecting station can then directly generate some routing signals in the larger network from the acoustic frequency itself.

What is claimed is:
1. A common medium multichannel exchange system of the type including a common medium, a plurality of customers or facilities, and means for coupling signals from and to said plurality of customers or facilities onto and off of the common medium, characterized in that the common medium is an optical common waveguide medium and in that the coupling means comprise optical directional filters of differing pass bands at least some of which are tunable over the entire exchange system bandwidth.

2. A common medium multichannel exchange system of the type claimed in claim 1 in which the tunable directional filters comprise tunable optical diffraction-grating directional filters.

3. A common medium multichannel exchange system of the type claimed in claim 1 in which the tunable directional filters are of the type employing a tunable acoustic-optic diffraction-grating effect.

4. A common medium multichannel exchange system of the type claimed in claim 2 in which the common medium is a complete loop-type common medium of the optical waveguide type and in which the number of customers or facilities do not exceed the number of available optical communication channels, each different optical frequency band being associated in a one-to-one correspondence with a corresponding wavelength intended for affecting the corresponding directional filter.

5. A common medium multichannel exchange system of the type claimed in claim 4 in which the same directional filter provides both coupling onto the common medium and coupling off of the common medium, the system including means for tuning each filter as a channel-combining filter in response to information about message destination when providing coupling onto the common medium.

6. A common medium multichannel exchange system of the type claimed in claim 5 including a local calling station and a distant called station or facility, both coupled to the common medium by respective directional filters, the calling station including a tunable laser, and means tracking the filter tuning means for tuning the tunable laser.

7. A common medium multichannel exchange and switching system of the type including a common medium, a plurality of customers or facilities, and a plurality of means for coupling said plurality of customers or facilities onto and off of the common medium, characterized in that the common medium is an optical waveguide common medium and in that the plurality of means for coupling signals from said plurality of customers and facilities onto said common medium comprise optical diffraction-grating directional filters, and the plurality of means for coupling signals to said plurality of customers and facilities off of said common medium comprise a plurality of subsidiary optical waveguide media and optical diffraction-grating directional filters that are tunable over the entire exchange system bandwidth and that comprise tunable acousto-optic diffraction-grating directional filters effective to provide phase-matching between the optical waveguide common medium and respective subsidiary media only in the presence of specific respective acoustic waves.

8. A common medium multichannel exchange and switching system of the type claimed in claim 7 in which the plurality of means for coupling signals from said plurality of customers and facilities onto said common medium comprise fixed optical diffraction-grating directional channel-combining filters.

9. A common medium multichannel exchange and switching system of the type claimed in claim 8 including means for controlling the tuning of the tunable acousto-optic diffraction-grating directional filters, said tunable filters characteristically including acousto-optical transducers, comprising an electronic central switching system including a central processor and tunable electronic oscillators generating differing frequencies as the controlled outputs of said electronic switching system, said oscillators being connected to said tunable acousto-optical couplers at said transducers to generate acousto-optical diffraction-grating effects therein.

10. A common medium multichannel exchange and switching system of the type claimed in claim 9 in which the tunable filters are distributed among the common medium to be relatively near the customers or facilities from which they are coupling signals.

11. A common medium multichannel exchange and switching system of the type claimed in claim 7 in which the common medium is a complete loop-type common medium of the optical waveguide type and in which the number of called customers or facilities do not exceed the number of available optical communication channels, each different optical frequency band being associated in a one-to-one correspondence with a corresponding acoustic wavelength intended for affecting the corresponding coupler, to provide nonblocking characteristics for said system.

12. A common medium multichannel exchange and switching system of the type claimed in claim 11 in which a portion of the available optical communication channels are of sufficient channel bandwidth to accommodate the bandwidths of respective facilities to be switched, said system including means for providing facility switching with at least a portion of said large bandwidth channels.

* * * * *